(12) United States Patent
Khatri et al.

(10) Patent No.: US 9,836,378 B2
(45) Date of Patent: *Dec. 5, 2017

(54) METHODS FOR MANAGING PERFORMANCE STATES IN AN INFORMATION HANDLING SYSTEM

(71) Applicant: Dell Products L.P., Round Rock, TX (US)

(72) Inventors: Mukund Purshottam Khatri, Austin, TX (US); Tuyet-Huong Thi Nguyen, Austin, TX (US); Vijay Nijhawan, Austin, TX (US); Robert Hormuth, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/964,356

(22) Filed: Dec. 9, 2015

(65) Prior Publication Data

US 2016/0098338 A1 Apr. 7, 2016

Related U.S. Application Data

(63) Continuation of application No. 12/475,063, filed on May 29, 2009, now Pat. No. 9,244,797.

(51) Int. Cl.
*G06F 9/30* (2006.01)
*G06F 11/34* (2006.01)
(Continued)

(52) U.S. Cl.
CPC ...... *G06F 11/3409* (2013.01); *G06F 9/45533* (2013.01); *G06F 11/301* (2013.01);
(Continued)

(58) Field of Classification Search
None
See application file for complete search history.

(56) References Cited

U.S. PATENT DOCUMENTS 7,089,430 B2 8/2006 Cooper .................. 713/300
7,219,241 B2 5/2007 Cooper et al.
(Continued)

OTHER PUBLICATIONS

Hewlett-Packard Corp. et al., Advanced Configuration and Power Interface Specification, Oct. 10, 2006, pp. 262-278, Revision 3.0b, [available at http://www.acpi.info].

*Primary Examiner* — William B Partridge
(74) *Attorney, Agent, or Firm* — Baker Botts L.L.P.

(57) ABSTRACT

An information handling system (IHS) is disclosed wherein the system includes a processor associated with at least one performance state (P-state), and a memory in communication with the processor. The memory is operable to store a virtualization software and a basic input/out system (BIOS). The BIOS is configured to report a parameter of the P-state to the virtualization software. In addition, the BIOS is configured to transition the processor into a desired P-state. A method for managing performance states in an information handling system (IHS) is further disclosed wherein the method includes providing a basic input/output system (BIOS) in communication with a processor, the processor associated with an at least one performance state (P-state) and reporting a parameter of the at least one P-state to a virtualization software via the BIOS. The method further includes transitioning the processor to a desired P-state via the BIOS.

20 Claims, 3 Drawing Sheets

(51) Int. Cl.
  *G06F 9/455* (2006.01)
  *G06F 11/30* (2006.01)
(52) U.S. Cl.
  CPC ...... *G06F 11/3055* (2013.01); *G06F 11/3065* (2013.01); *Y02B 60/146* (2013.01); *Y02B 60/148* (2013.01)

(56) References Cited

U.S. PATENT DOCUMENTS

| | | | |
|---|---|---|---|
| 2005/0060590 A1 | 3/2005 | Bradley et al. | 713/320 |
| 2010/0235834 A1 | 9/2010 | Faasse et al. | 718/1 |

METHODS FOR MANAGING PERFORMANCE STATES IN AN INFORMATION HANDLING SYSTEM

CROSS-REFERENCES TO RELATED APPLICATIONS

The present application is a continuation of U.S. patent application Ser. No. 12/475,063 filed May 29, 2009; which is hereby incorporated by reference in its entirety for all purposes.

TECHNICAL FIELD

The present disclosure relates generally to the field of information handling systems, and more specifically, to systems and methods for managing performance states in information handling systems.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a virtualization environment, virtualization software (e.g., hypervisor, virtual machine monitor) or operating systems (OSs) may allow multiple machines, i.e., virtual machines (VMs), to run on a host IHS. The virtualization software or OSs may need to provide guaranteed performance for its virtual machines (VM). To that end, in systems where a performance or wattage optimization mode is enabled via an operating system (OS) based driver, as in Microsoft Windows, for example, the OS based driver may rely on knowing which performance state (i.e., P-state) the central processing unit (CPU) is running.

Typically, an OS and or virtualization software may manage the CPU performance states through their own respective driver(s). However, in some instances, the P-states may be managed outside of the OS context, such as, via BIOS, stored in non-volatile memory of the IHS, or baseboard management controller (BMC). Under current implementations, BIOS may be unable to report the P-states to the OS and/or virtualization software since doing so may enable the OS or virtualization software to also control the P-states. Therefore, conflicts between the OS or virtualization software and the BIOS/BMC based performance state manager may exist as each component may have its own algorithms for determining when to change P-states. As a result, performance state objects are not currently available to a typical OS or virtualization software, and therefore, the OS or virtualization software may have no knowledge of the current performance state(s) at which the CPU is running.

Thus, a need exists for methods and systems that would allow a BIOS/firmware to report the availability of CPU performances states and/or the maximum available P-states to an OS and/or virtualization software while preventing the OS and/or virtualization software from accessing control of the performance states.

SUMMARY

The following presents a general summary of several aspects of the disclosure in order to provide a basic understanding of the disclosure. This summary is merely an overview of the disclosure and is not intended to identify key or critical elements of the disclosure or to delineate the scope of the claims. The following summary presents some concepts of the disclosure in a general form as a prelude to the more detailed description that follows.

One aspect of the disclosure provides an information handling system (IHS). The IHS may include a processor associated with at least one performance state (P-state), and a memory in communication with the processor. The memory may be operable to store a virtualization software and a basic input/out system (BIOS). The BIOS may be configured to report a parameter of the P-state to the virtualization software. In addition, the BIOS may be configured to transition the processor into a desired P-state.

Another aspect of the disclosure provides a method for managing performance states in an IHS. The method includes providing a BIOS in communication with a processor, wherein the processor may be associated with at least one P-state. A parameter of the P-state may be reported to a virtualization software via the BIOS. Further, the processor may be transitioned to a desired P-state via the BIOS.

A further aspect of the present disclosure includes a method for managing performance state in an IHS. The method may include providing a BIOS in communication with a processor. As such, the processor may be associated with an at least one P-state. Furthermore, the method may include reporting a parameter of the at least on P-state to a virtualization software via the BIOS. The method may also include transitioning the processor to a desired P-state via the BIOS.

Yet another aspect of the disclosure provides a computer-readable medium having computer-executable instructions for performing a method for managing performance states in an IHS. The method includes providing a BIOS in communication with a processor, wherein the processor may be associated with at least one P-state. A parameter of the P-state may be reported to a virtualization software via the BIOS. Further, the processor may be transitioned to a desired P-state via the BIOS.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
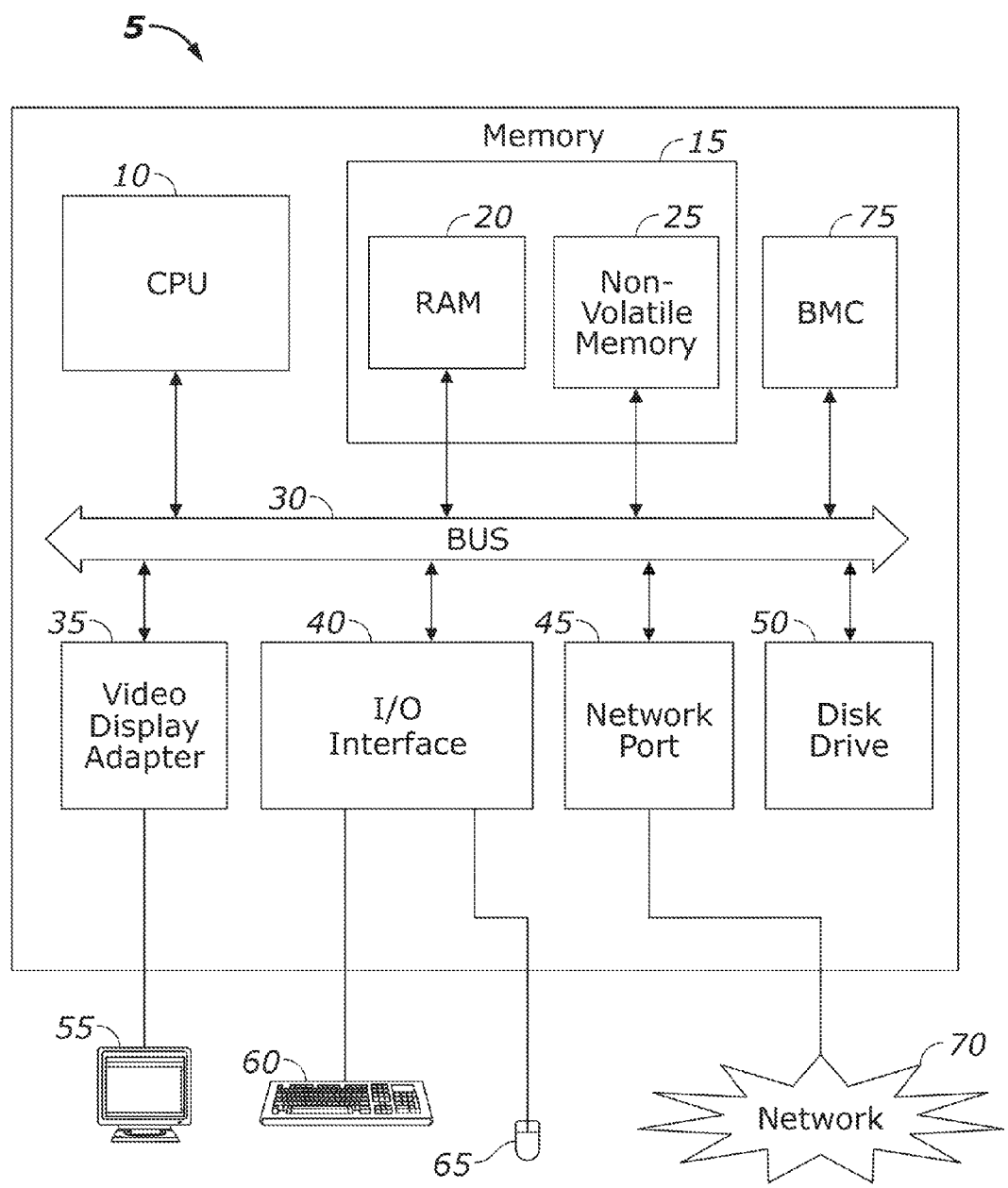
FIG. 1 provides a schematic illustrating an information handling system (IHS) in accordance with one aspect of the present disclosure.

Before the present methods and computer-readable media are described, it is to be understood that this disclosure is not limited to the particular methods and computer-readable media described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a device" refers to one or several devices, and reference to "a method of processing" includes reference to equivalent steps and methods known to those skilled in the art, and so forth.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

In addition, for purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

The methods of the present disclosure, including the detailed description and the claims, may be presented in terms of logic, software or software implemented aspects which are typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Referring to FIG. 1, one possible implementation of an Information Handling System or IHS 5 which comprises a CPU 10 is illustrated. In FIG. 1, it should be understood that the present disclosure has applicability to IHSs as broadly described above, and is not intended to be limited to the IHS 5 as specifically described. The CPU 10 or controller 10 may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system (OS) and application programs (e.g., graphical user interfaces) may be stored in the RAM 20 for execution.

As used herein, an operating system (OS) may refer to the software responsible for allocating system resources including, but not limited to, memory, processor time, disk space, and peripheral devices or I/O devices such as printers, modems, monitors or the like. Applications executed on the IHS may use the OS to gain access to the resources as necessary. Further, the OS is typically the first program loaded into the IHS as it boots up, and it remains in memory (e.g., RAM) throughout the computing session.

Within the non-volatile memory 25 may be stored a plurality of instructions, known as the basic input/output operating system (BIOS) executed by the CPU 10. The BIOS is the first set of instructions executed when the IHS is powered on to identify, test and/or initialize system components such as the hard disk drive (HDD), video display card or the like. The OS stored in the RAM 20 may execute in conjunction with the BIOS.

Furthermore, a Baseboard Management Controller (BMC) 75 may also be in communication with the bus 30. The BMC 75 may be a microcontroller embedded on the IHS 5 that monitors the health of the IHS 5. The term health is used to mean an operational or non-operational condition, within acceptable limits or ranges, of a part or the whole of the IHS. The term health may also include any other parameter relating to an IHS which is desirable to monitor. Among other tasks, the BMC 75 conducts fault monitoring of voltage, fan, thermal conditions, or the like. BMC may further use communication links to ensure notification of potential problems and/or system failure. While monitoring events, it may receive and log event messages in an event log.

Continuing with FIG. 1, the IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

In one implementation, the IHS 5 may comprise a CPU 10 having at least one performance state, also known as P-states, according to the Advanced Configuration and Power Interface (ACPI) Specification. ACPI may provide a framework for how to dynamically reduce power consumption in an IHS 5. To this end, ACPI may define certain P-states such as P0, P1 to Pn for the CPU. The number of P-states supported may vary with the CPU. In different P-states, the CPU may run at different processor configurations such as different operating frequencies, operating voltages, other scaling levels or parameters, and any combination of the aforementioned parameters. For example, when the CPU 10 is in the P0 P-state, the CPU may utilize its maximum performance capability and may consume maximum power. As another example, in the P1 P-state, the performance capability of the CPU may be limited below its maximum and may consume less than maximum power. In the 'Pn' performance state, the performance capability of the CPU may be at its minimum level and may consume minimal power while remaining in an active state. As used herein, "n" may correspond to any maximum number or integer. Further, "n" may be CPU dependent and the CPU may define support for any number of n performance states. For example, a given CPU may have a core frequency of 2.8 GHz and a core voltage of 1.5 V associated with a maximum P-state. Furthermore the CPU may have a core frequency of 1.6 GHz and core voltage of 1.2V associated with a minimum P-state. As such, any number of P-states, and thus any sets of associated core frequencies and voltages, may exist between the maximum P-state and the minimum P-state.

Depending on the needs of the IHS and/or user, the CPU may operate at different performance states. In order to conserver power, the IHS 5 may direct the CPU to operate in a relatively lower performance state than its maximum performance state. For example, for relatively low CPU intensive tasks, e.g., word processing and Internet browsing, the CPU may be placed in a relatively low performance state such as Pn. Conversely, for relatively higher CPU intensive tasks, e.g., graphics design and games, the CPU may be placed in a relatively higher performance state such as P0. In addition, other considerations may also affect the P-state of a CPU including, but not limited to, power source (e.g., battery or power supply), thermal conditions, and user direction. Regarding the latter, a user can manually cause the CPU to be placed in certain P-states by manually indicating a desire to conserve power in a portable IHS.

Figure 2:
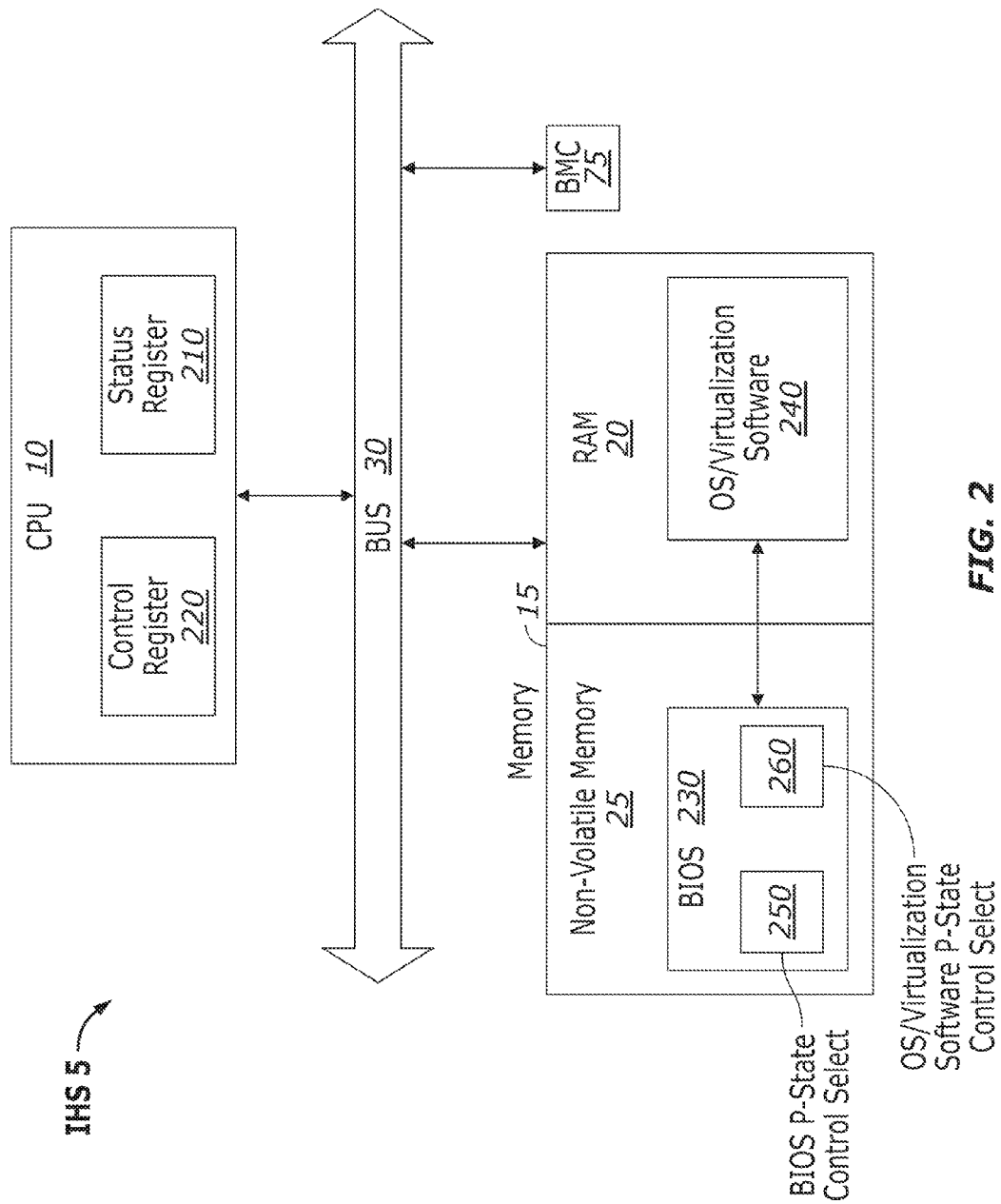
FIG. 2 represents a schematic illustrating a system for managing performance state in accordance with one aspect of the present disclosure.

FIG. 2 represents a schematic illustrating an IHS for managing P-states in accordance with one aspect of the present disclosure. In the IHS 5, the CPU 10 may include a status register 210. The status register 210 may be read from any device or program to determine the current P-state in which the CPU 10 is executing. As such, the status register 210 may provide the current operating frequency and the current operating voltage of the CPU 10, i.e., the frequency and voltage at which the CPU 10 is presently running. For example, an operating frequency may be 2 Gigahertz while an operating voltage may be 1.3 volts.

As shown in FIG. 2, the CPU 10 may further include a control register 220. The control register 220 may be written to, e.g., by any device or program, with a value corresponding to a desired P-state to transition the CPU 10 from a current P-state into the desired P-state. For example, the value may include the core frequency and the core voltage associated with a particular P-state. It should be noted that one of ordinary skill in the art would understand that such a value may be specific to the particular CPU being employed. Thus, the desired P-state written to the control register may be different from the current P-state that is stored in the status register 210. Generally, both the status register 210 and the control register 220 may be referred to as Model Specific Registers (MSRs), which may refer to registers available on processors that provide functions specific to those processors.

As previously described with reference to FIG. 1, the IHS 5 may include a memory 15 of which may include a non-volatile memory 25 and a RAM 20. The memory 15 and the CPU 10 may be coupled to the bus 30 and may communicate with each other through the bus 30. Furthermore, the BIOS 230 may be stored in the non-volatile memory 25 and the OS or virtualization software 240 may be stored in the RAM. Virtualization software 240 in an IHS 5 may allow multiple software implemented machines, called virtual machines (VMs), to execute or run on a single, physical underlying machine, such as a host IHS. Under this framework, the virtualization software 240 may manage and allocate the underlying machine's resources between all the VMs, though distinct sets of resources may be simulated for each individual VM. These resources may include, but are not limited to, the processing, storage, and memory capabilities of the host IHS. Thus, since each VM may believe itself to exist as its own distinct IHS, this degree of separateness may enable different operating systems to be executed on each VM. Additionally, in some instances, the virtualization software 240 may be referred to as the hypervisor.

While the following discussion concerning P-state management may be made with specific reference to ACPI standard, it should be understood that other standards that manage performance state in a CPU are also contemplated within the present disclosure. As such, the present disclosure is not limited to any specific objects, methods, structures, and/or the like that may be mentioned with respect to ACPI. Similarly, any proposed objects, methods, structures, and/or the like are also no limited to being implemented under the ACPI standard.

Under conventional systems, the management of the P-states for the CPU 10 may be conducted by the OS. As such, the OS may be provided with certain objects as defined by a source code. In one implementation, the source code may be the ACPI source language (ASL), and objects from the ASL may be provided to the OS by the BIOS. In particular, under conventional implementations, the BIOS may provide the _PSS (Performance Supported States), _PCT (Performance Control), _PPC (Performance Present Capabilities), and _PSD (P-state Dependency) objects to the OS. Such objects may be created by BIOS and stored in a designated portion of system memory accessible by the OS.

The _PCT object may provide the OS 240 with access to the status register 210 and the control register 210, thereby allowing the OS 240 to manage the P-states of the CPU 10 under conventional schemes.

The _PSS object may provide to the OS a table which includes every P-state that can be possibly supported by the CPU 10 assuming no limitations on the CPU have been set worth. For example, if the CPU 10 has P-states P0 to P5, the table provided by the _PSS object may provide entries for each P-state. As such, the table may contain information corresponding to each supported P-state including, but not limited to, operating frequency, operating voltage, and power dissipation.

As another example of an object, the _PPC object may be a method that dynamically indicates to the OS the number of P-states that the OS can currently support. This number may be less than or equal to the number of P-states contained by the table provided by the _PSS object. Furthermore, the _PPC structure may indicate a P-state limit, i.e., the current P-state supported by the processor with the highest performance capabilities. For example, though a CPU 10 may support P-states P0 through P5, a limitation may be placed on the CPU 10 such that the CPU may operate in the range P2 through P5. As such, the P-state limit in this scenario would be P2.

In addition, the _PSD object may provide P-state control to the OS for a CPU 10 that supports multi-threading technology. Multithreading technology may enable certain applications to take advantage of multiple cores in a CPU to execute multiple tasks in a seemingly simultaneous fashion. Thus, multi-threading technology may provide significant enhancements for multi-tasking. To this end, the _PSD object may provide controls over which cores to use at different moments.

On the other hand, current systems may enable the BIOS to manage the P-states of the CPU 10 agnostic of the OS 240. Notably, while references may be made to BIOS conducting P-state management, it should be understood that other devices may also be used in place of the BIOS such as the BMC and/or other kinds of service processors. Since BIOS 230 may manage the P-states, such management may be independent of the OS 240 operating in the IHS 5, thereby providing more flexibility in P-state management. As such, in implementations where BIOS 230 conducts P-state management, BIOS may no longer report the conventional ACPI objects (e.g., _PCT, _PSS, _PPC, _PSD) because these objects inherently allow the OS/virtualization software 240 access to P-state management to. For example, as previously mentioned, the _PCT object provides the OS with direct access to the control register 220 in the CPU 10, which gives the OS control over managing or transitioning the P-states from one P-state to another. Consequently, providing both the BIOS 230 and the OS 240 with access to P-state management in the CPU may produce significant conflicts since each entity may execute different algorithms for determining when to change P-states. I As a result of such conflicts, current implementations that employ BIOS management of P-states may simply choose not to report P-state information to the OS in order to prevent OS control of P-states. However, such a limitation may prove especially cumbersome for IHSs 5 using virtualization software 240. Indeed, virtualization software 240 (e.g., hypervisor), stored in RAM 20, may need to provide a guaranteed performance for its VMs, since the VMs assume that a certain amount of resources are available. Consequently, for virtualization software 240 that need to provide a guaranteed performance to its VMs, a need exists for methods and systems that would allow a BIOS 230 to report or transmit to the virtualization software 240 (1) the number of CPU P-states available and the current P-state, and/or (2) the current maximum P-state (or Max P-state) for these configurations without creating a conflict between the BIOS 230 and the virtualization software 240.

Therefore, the present disclosure may contemplate a new ACPI object(s) that enable the BIOS 230 to report a parameter regarding information of the CPU's 210 P-states to the virtualization software 240 without enabling the virtualization software 240 to control the P-states. In one implementation, these new ACPI objects may be provided in lieu of the conventional ACPI objects. In another implementation, the new ACPI objects may be provided along with the conventional ACPI objects. In such an implementation, the BIOS may include a mechanism for instructing the OS to ignore the conventional ACPI objects.

In addition to the aforementioned objects, a mechanism is also defined to notify the hypervisor that the maximum possible P state(s) available to the system is/has changed. For example, if due to some external event, a server's maximum possible P state is reduced, BIOS will notify the hypervisor to reevaluate the PPPC method. By way of example only, below is provided a sample code by which notification may be made to the hypervisor

```
Method (\_GPE._Lxx) {
  // where xx is level triggered interrupt system control interrupt (SCI)
    handler.
  Notify (\_PR.CPU1, 0xBE)    // Cap the P state
  Notify (\_PR.CPU2, 0xBE)    // Cap the P state
  Notify (\_PR.CPU3, 0xBE)    // Cap the P state
  Notify (\_PR.CPU4, 0xBE)    // Cap the P state
  Notify (\_PR.CPU5, 0xBE)    // Cap the P state
  Notify (\_PR.CPU6, 0xBE)    // Cap the P state
  Notify (\_PR.CPU7, 0xBE)    // Cap the P state
  Notify (\_PR.CPU8, 0xBE)    // Cap the P state
  Notify (\_PR.CPU9, 0xBE)    // Cap the P state
  Notify (\_PR.CPUA, 0xBE)    // Cap the P state
  Notify (\_PR.CPUB, 0xBE)    // Cap the P state
  Notify (\_PR.CPUC, 0xBE)    // Cap the P state
  Notify (\_PR.CPUD, 0xBE)    // Cap the P state
  Notify (\_PR.CPUE, 0xBE)    // Cap the P state
  Notify (\_PR.CPUF, 0xBE)    // Cap the P state
  Notify (\_PR.CPUG, 0xBE)    // Cap the P state
  }
```

In the aforementioned example, Lxx control method (e.g., interrupt) may notify the processor object the value 0xBE, indicating that the maximum possible P state capability of the system has been changed and that the hypervisor should reevaluate the data returned by the PPPC object. The present example assumes the system includes 16 logical processors and hence it is notifying that each logical processor's maximum P state has been changed.

The parameter regarding the CPU's 210 P-states may include a new object PPSS (Passive Performance Supported States), a new object PPPC (Passive Performance Present Capabilities), or any combination of the two. Furthermore, the parameter may be provided to the virtualization software 240 from the BIOS 230. According to this implementation, PPSS may provide to the virtualization server 240 a structure which includes a table containing all the supported P-states of the CPU 10, i.e., all the P-states to which the CPU 10 can transition. Furthermore, the PPSS object may also include the operating frequencies and voltages corresponding to each P-state, respectively. The PPSS object may also enable the virtualization server 240 access the status register 210 on the CPU 10 in order to determine the current P-state in which the CPU 10 is operating. Notably, however, the PPSS object does not enable the virtualization server 240 to access or write to the control register 200 or to manage the transitioning of P-states in any form. At least a portion of the 'PPSS ACPI method is set forth below, as follows:

```
a) PPSS ("Passive" Performance Support States)
Name (PPSS, Package( )
{
Package( )//Performance Sate 0 Definition
{CoreFreq,
Power
},
...
Package( )//Performance State n Definition
{CoreFreq,
Power
},
})//End of PPSS object
```

Additionally, if the parameter is the PPPC object, the parameter may provide to the virtualization software 240 a P-state limit, which may indicate the P-state with the highest performance capability (i.e., a maximum P-state) that is currently supported by the CPU 10. The definition for the PPPC object may be similar to that of the conventional _PPC object but may be renamed to avoid confusion by the virtualization software 240. In addition, the PPPC object may also be operable to provide a P-state corresponding to a situation in which the CPU 10 is operating in a throttle mode. A throttled mode for the CPU 10 may be entered during certain thermal conditions in order to scale back the operating frequency of the CPU 10. Such conditions may include when a PROC_HOT signal is asserted by the IHS 5, such as in the event of a power supply failure, for example. Notably, the PPPC object also does not provide any P-state control to the virtualization software 240. Furthermore, at least a portion of the 'PPPC ACPI method 0xBE is set forth below, as follows:

```
b) PPPC ("Passive" Performance Presence Capabilities)
? Method(PPPC){
- Reports or Returns the maximum number of P performance states available
in current environment
- }
```

The new PPSS and PPPC objects may provide necessary information regarding to the P-states to the virtualization software 240 such that the virtualization software may allocate resources to its VMs appropriately. For example, if a CPU 10 transitions from a relatively higher P-state to a relatively lower P-state (e.g., from P2 to P3), the operating frequency and operating voltage of the CPU 10 may also be lowered accordingly. For example, P2 may have an operating frequency of about 2.8 GHz and operating voltage of about 1.5 V while P3 may include an operating frequency of about 2.4 GHz and operating voltage of about 1.4 V. Thus, the virtualization software 240 may not be able to support as many VMs according to a certain performance criteria in the P3 state as it could in the P2 state. Because the virtualization software 240 may now comprehend the lower P-state conditions due to the PPSS and PPPC objects, the virtualization 240 may take certain actions to accommodate the lower P-state. Such actions may include, but are not limited to, transferring VMs to another host IHS that can support the VMs, actually disabling certain VMs and thereby reducing the number VMs hosted by the virtualization software, and/or simply reporting to a user that performance of the VMs according to the certain performance criteria cannot be achieved.

Furthermore, as depicted in FIG. 2, the BIOS 230 may include two options for P-state management for the CPU 10. The BIOS P-state control select 250 may enable the BIOS 230 to manage the P-states while the OS/virtualization software P-state control select 260 may allow for OS/virtualization software 240 management of the P-states. Thus, depending on the system and it components, a user may determine which device performs the P-state management.

While references have been made to new ACPI objects such as PPSS and PPPC, it should be understood that other naming possibilities also exist for those objects. In addition, different methods by which to provide the P-state information contained within the said objects are also contemplated within the present disclosure. Furthermore, as previously mentioned, the present disclosure is not limited to the ACPI standard and may contemplate any standard that facilitates management of performance states. To this end, the present disclosure encompasses all systems and methods by which BIOS may report P-state information to an OS or virtualization software while retaining sole control of P-state management.

Figure 3:
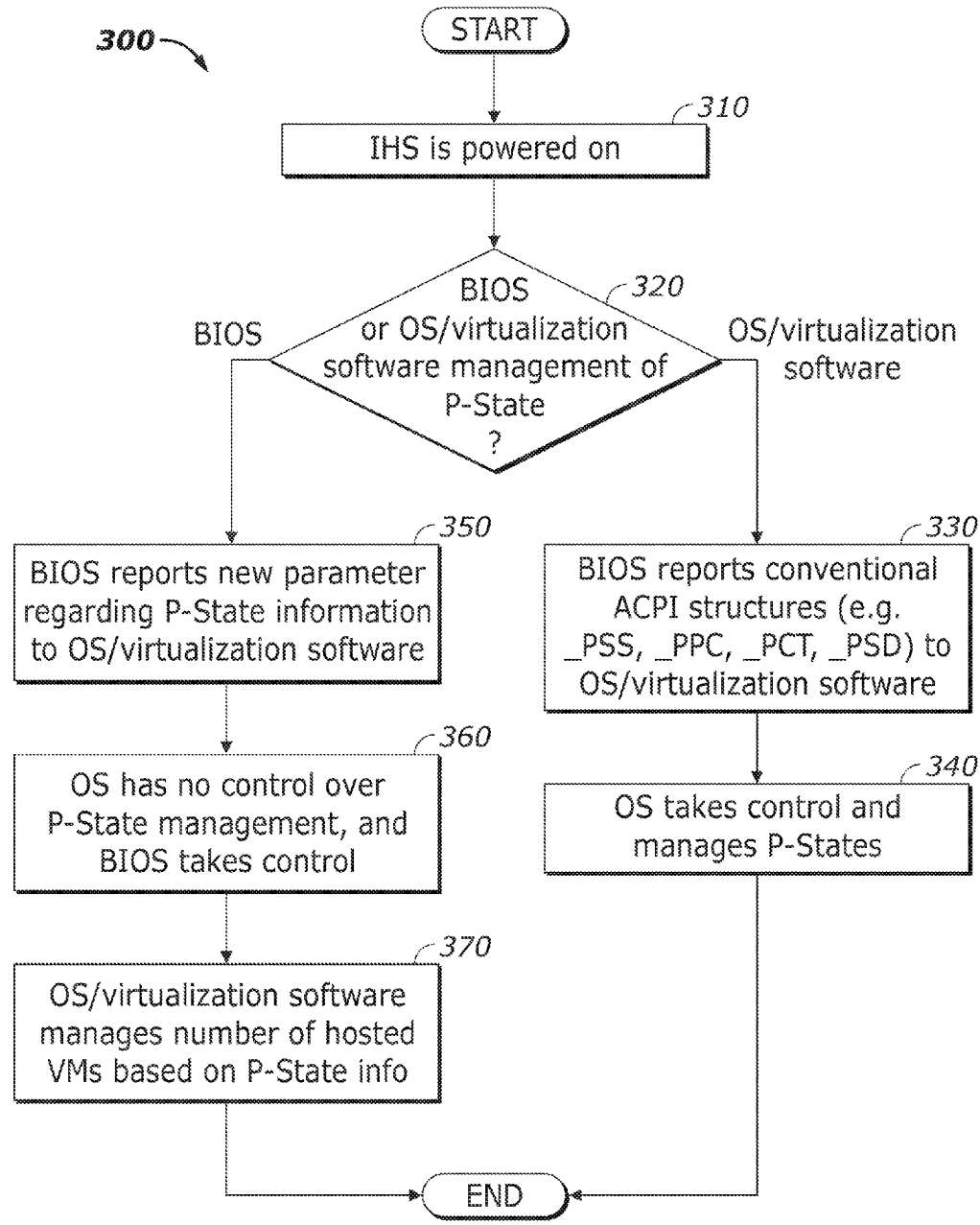
FIG. 3 provides a flow diagram for a method of managing performance states in an IHS.

Turning now to FIG. 3, a method 300 may be provided for managing P-states in an IHS in accordance with one aspect of the present disclosure. The method 300 may begin in step 310 where the IHS is power on. In step 320, a determination is made as to whether the BIOS or the OS/virtualization software performs the P-state management of the IHS.

As previously mentioned in the discussion of FIG. 2, the BIOS may include an option to select between these two choices. In one implementation, a user may manually select the option desired based on the user's preferences. For example, a user may enter the BIOS of an IHS where the BIOS may provide an option to either enable BIOS management of the P-states or OS/virtualization software management of the P-states. A user may then choose which option best suits a particular system. In this manner, an IHS whose OS/virtualization software does not understand objects that provide sole control of P-state management to the BIOS, e.g, the ACPI objects proposed in the discussion of FIG. 2, can still enable the OS/virtualization software to manage the P-states as before.

Continuing with step 330, if OS/virtualization software P-state management is chosen, BIOS may report the conventional ACPI structures, e.g., _PSS, _PPC, _PCT, _PSD to the OS/virtualization software. Subsequently, the OS/virtualization software may take direct control of the P-state management in step 340 through those ACPI structures. For example, the _PCT method in particular may provide the OS/virtualization software direct access to a control register on the CPU, which provides the mechanism to transition from one P-state to another P-state.

On the other hand, if BIOS is chosen as the preferred means to manage the P-states, BIOS may not report the conventional ACPI structures to the OS/virtualization software and my instead report the new parameter regarding P-state information to the OS/virtualization software in step 350. As previously discussed with reference to FIG. 2, the new parameter may include the PPSS structure, the PPPC structure, or any combination of those structures. Through these structures, the OS may be aware of certain P-state information such as all the P-states supported by the CPU in the IHS, the current P-state in which in the CPU is operating, the current P-state limit, and/or the like.

In step 360, because the parameter does not allow the OS/virtualization software to take control of the P-states, the BIOS retains management of the P-states. The parameters may, however, provide information about the P-states to the OS/virtualization software such that the OS/virtualization software may be able to manage the number of VMs it hosts. For example, the OS/virtualization software may not be able to host as many VMs in a lower P-state as it may in a higher P-state. In the event that the CPU has transitioned to a lower P-state, and as a result, the OS/virtualization software can no longer guarantee certain performance capabilities of the VMS, the OS/virtualization software may take certain remedial actions. Such may include, for example, transferring VMs to another IHS that can support the VMs, actually disabling certain VMs, and/or simply reporting to a user that performance of the VMs according to the certain performance criteria cannot be achieved.

Thus, the present disclosure provides methods and systems for managing P-states in an IHS. In particular, the present disclosure provides methods and systems by which BIOS retains sole control of P-state management but may still report certain P-state information to the OS/virtualization software. Consequently, the OS/virtualization software may limit the number of VMs it hosts according to the P-state information.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An information handling system (IHS), comprising:
a processor associated with a performance state (P-state); and
a memory in communication with the processor, the memory operable to store a virtualization software and a basic input/output system (BIOS), the BIOS configured to report a parameter of the P-state to the virtualization software without enabling the virtualization software to control the P-state.

2. The system of claim 1, wherein the virtualization software is configured to support a plurality of virtual machines.

3. The system of claim 2, and wherein a number of the plurality of virtual machines supported by the virtualization software is determined based on the parameter.

4. The system of claim 1, wherein the parameter comprises a plurality of supported P-states of the processor.

5. The system of claim 1, wherein the parameter comprises a P-state limit indicating a maximum P-state to which the processor can transition.

6. The system of claim 1, wherein the parameter comprises a P-state indicating the processor is operating in a throttle mode.

7. The system of claim 1, wherein the BIOS is further configured to transition the processor into a second P-state.

8. The system of claim 7, wherein the processor comprises a control register, and wherein the BIOS is configured to transition the processor into the second P-state by writing a value corresponding to the second P-state into the control register.

9. A method for managing performance states in an information handling system (IHS), the method comprising:
providing a basic input/output system (BIOS) in communication with a processor, the processor associated with a performance state (P-state); and
reporting a parameter of the P-state to a virtualization software via the BIOS without enabling the virtualization software to control the P-state.

10. The method of claim 9, further comprising supporting a plurality of virtual machines via the virtualization software.

11. The method of claim 10, further comprising determining, based on the parameter, a number of the plurality of virtual machines supported by the virtualization software.

12. The method of claim 9, wherein the parameter comprises a plurality of supported P-states of the processor.

13. The method of claim 9, wherein the parameter comprises a P-state limit indicating a maximum P-state to which the processor can transition.

14. The method of claim 9, wherein the parameter comprises a P-state indicating the processor is operating in a throttle mode.

15. A non-transitory computer-readable medium communicatively coupled to a processor and having instructions stored thereon, the instructions configured to, when executed by the processor, cause the processor to:
report a parameter of a performance state (P-state) to a virtualization software without enabling the virtualization software to control the P-state, the P-state is associated with the processor.

16. The computer-readable medium of claim 15, wherein the processor is further caused to support a plurality of virtual machines via the virtualization software.

17. The computer-readable medium of claim 16, wherein the processor is further caused to determine, based on the parameter, a number of the plurality of virtual machines supported by the virtualization software.

18. The computer-readable medium of claim 15, wherein the parameter comprises a plurality of supported P-states of the processor.

19. The computer-readable medium of claim 15, wherein the parameter comprises a P-state limit indicating a maximum P-state to which the processor can transition.

20. The computer-readable medium of claim 15, wherein the parameter comprises a P-state indicating the processor is operating in a throttle mode.

* * * * *